United States Patent [19]
Brochu et al.

[11] Patent Number: 5,711,006
[45] Date of Patent: Jan. 20, 1998

[54] SYSTEM AND METHOD FOR ADDRESSING A RELEASE RESOURCE MESSAGE

[75] Inventors: Jean-Pierre Brochu, Montreal; Francois Sawyer, St-Hubert, both of Canada

[73] Assignee: Telefonaktiebolaget LM Ericsson (publ), Stockholm, Sweden

[21] Appl. No.: 510,972

[22] Filed: Aug. 3, 1995

[51] Int. Cl.⁶ ................................................ H04M 11/00
[52] U.S. Cl. ........................ 455/445; 455/422; 455/433; 455/442
[58] Field of Search ........................ 379/230, 63, 60, 379/59, 213; 455/54.1, 58.1, 33.1

[56] References Cited

U.S. PATENT DOCUMENTS

| | | | |
|---|---|---|---|
| 5,153,902 | 10/1992 | Buhl et al. | 379/57 |
| 5,278,890 | 1/1994 | Beeson, Jr. et al. | 379/57 |
| 5,282,240 | 1/1994 | Buhl et al. | 379/59 |
| 5,369,684 | 11/1994 | Buhl et al. | 455/445 |
| 5,583,916 | 12/1996 | Maenpaa | 455/422 |

*Primary Examiner*—Dwayne Bost
*Assistant Examiner*—Myron K. Wyche
*Attorney, Agent, or Firm*—Smith & Catlett, P.C.

[57] ABSTRACT

A system and method for stopping call setup in a mobile telecommunication system having a home location register (HLR), a visiting mobile switching center (V-MSC) and a subscriber mobile station (MS). Upon determining that a call to the subscriber mobile station is being dropped by the calling party, or upon determining that calls are not to be routed to the mobile station when the mobile station is located in the service area of the V-MSC, a release resources message is transmitted to the HLR and the V-MSC stopping the paging process or releasing the system resources, including any such resources associated with seizure of a voice channel between the V-MSC and the MS.

23 Claims, 5 Drawing Sheets

SYSTEM AND METHOD FOR ADDRESSING A RELEASE RESOURCE MESSAGE

BACKGROUND OF THE INVENTION

1. Technical Field of the Invention

This invention relates to mobile telecommunication systems having mobile subscribers, and more particularly, to a system and method for promptly releasing system resources allocated to mobile stations.

2. Description of Related Art

In standard mobile telecommunication systems, a mobile subscriber is assigned a unique telephone number recognized by the public switched telephone network (PSTN). Calls to a particular mobile subscriber are routed by the PSTN to a gateway mobile switching center (G-MSC) which consults the subscriber's home location register (HLR) to obtain information regarding the location of the subscriber's mobile station, and other status information stored in a subscriber profile. A subscriber's mobile station transmits a unique electronic identification number (EIN) which is detected and identified by MSCs, after an initial registration procedure, whenever the mobile station is activated within the service area of a receiving exchange.

When a call is directed to a registered mobile station, the telecommunication system first locates the mobile station through a paging process. Specifically, the HLR orders an initial V-MSC to page the subscriber's mobile station. If the first V-MSC fails to locate the mobile station after one or more attempts, the HLR may order other V-MSCs to page the mobile station. Once the paging process has been completed, the call is routed or an "access denied" message is transmitted, depending on the status of the called mobile station.

Example systems and methods for locating a roaming mobile station and completing the setup of an incoming call are disclosed in U.S. Pat. Nos. 5,153,902; 5,278,890; and 5,282,240. U.S. Pat. No. 5,153,902 to Buhl et al relates to a multi-exchange paging system for locating a mobile station in a wide area telephone network. As disclosed in Buhl '902, the HLR in the mobile station's home exchange maintains a list of possible visiting exchanges (V-MSCs) in which the mobile subscriber may be located. When an incoming call is received, the home exchange initiates and coordinates a station location sequence and directs the call according to the outcome of this paging process. Buhl '902, however, does not address the procedure by which the mobile station is connected to the V-MSC, and in particular, does not teach or suggest a method of reducing the time that a voice channel is connected between the V-MSC and the mobile station prior to the routing of the call.

U.S. Pat. No. 5,278,890 to Beeson et al. relates to paging arrangements in a mobile switching system. Beeson '890 teaches a wireless global modular switching system which performs the functions of a switching center, home location register, authentication center, visitor location register, and equipment identification register. Beeson '890, however, is limited to the switching and termination of signal links between these modules and does not teach or suggest the timing or content of the messages transmitted therebetween.

U.S. Pat. No. 5,282,240 to Buhl et al. relates to a method of routing calls to mobile stations in a mobile telephone network. In particular, Buhl '240 teaches a call routing system and method wherein the paged mobile station is successfully paged and assigned to a voice channel before an incoming call is routed through the mobile telephone network. This page before routing methodology is supported by many mobile telecommunications systems today. Buhl '240, however, does not teach or suggest a system wherein the voice channel resources are utilized with maximum efficiency during the call-routing process.

Specifically, in page before routing telecommunication systems, before an incoming call is routed to a particular mobile subscriber, the interrogation, home and visiting exchanges engage in a paging process to locate the mobile station and establish a voice channel. Once a voice channel is seized, the mobile station remains connected to the voice channel while the incoming call is routed. This call routing process typically takes several seconds to complete. The call completion time period may be shortened to less than one second if the G-MSC and V-MSC are either very close or the mobile station is quickly located. In a worst case scenario, the voice channel may be engaged for a preset maximum time period allowed by the system, such as 31 seconds.

In cases where the call is dropped by the calling party or access is denied before routing is complete, the voice channel remains engaged, thereby unnecessarily occupying the resources of the communications network. This nonproductive drain on the system leads to decreased availability of resources for other users, thereby increasing the operation costs of the telecommunication system.

Additionally, subscriber confusion and dissatisfaction may result if the called subscriber attempts to place a call while the called mobile station remains held on the voice channel. At that point, the called subscriber has not received any indication that an incoming call connection is being attempted. Instead, upon activating the mobile station, the subscriber cannot originate a call until the voice channel is released. If the incoming call is not to be delivered, however, the voice channel and related resources are needlessly occupied.

Therefore, it would be a distinct advantage within the telecommunications industry to have an improved resources allocation system which either stops the mobile station paging process or releases the seized voice channel once it is determined that the call is not to be completed. The system and method of the present invention provide such a solution.

SUMMARY OF THE INVENTION

In mobile telecommunication systems utilizing page before routing methodology, a mobile station is paged, and a voice channel is established, prior to routing of an incoming call. In one aspect of the present invention, a system and method are provided for prompt release of the seized voice channel once the system determines that the call will not be completed.

In another aspect of the present invention, a release resources message is initiated and sent to a visiting mobile switching center by any modular communication center on a mobile network which determines that the incoming call will not be completed.

In another aspect of the present invention, a mobile telecommunications system having a call originating system and a visiting system is provided wherein a gateway mobile switching center of the originating system sends a release resources message to a visiting mobile switching center of a visiting system if the incoming call is dropped before call setup is completed.

In another aspect of the present invention, a mobile telecommunications system is provided wherein a gateway mobile switching center sends a release resources message to a visiting mobile switching center before paging of a called subscriber's mobile station is completed if the incoming call is dropped by the calling party or otherwise denied access before call setup is completed.

In still another aspect, the present invention provides a release resources message to the visiting mobile switching center if an analysis of the called mobile subscriber's profile in the home location register requires the system to deny access to the call.

BRIEF DESCRIPTION OF THE DRAWINGS

The invention will be better understood and its further objects and advantages will become more apparent to those skilled in the art by reference to the following drawings, in conjunction with the accompanying specification, in which.

Like reference numerals are used to indicate like parts in all figures of the drawings.

DETAILED DESCRIPTION OF EMBODIMENTS

Figure 1:
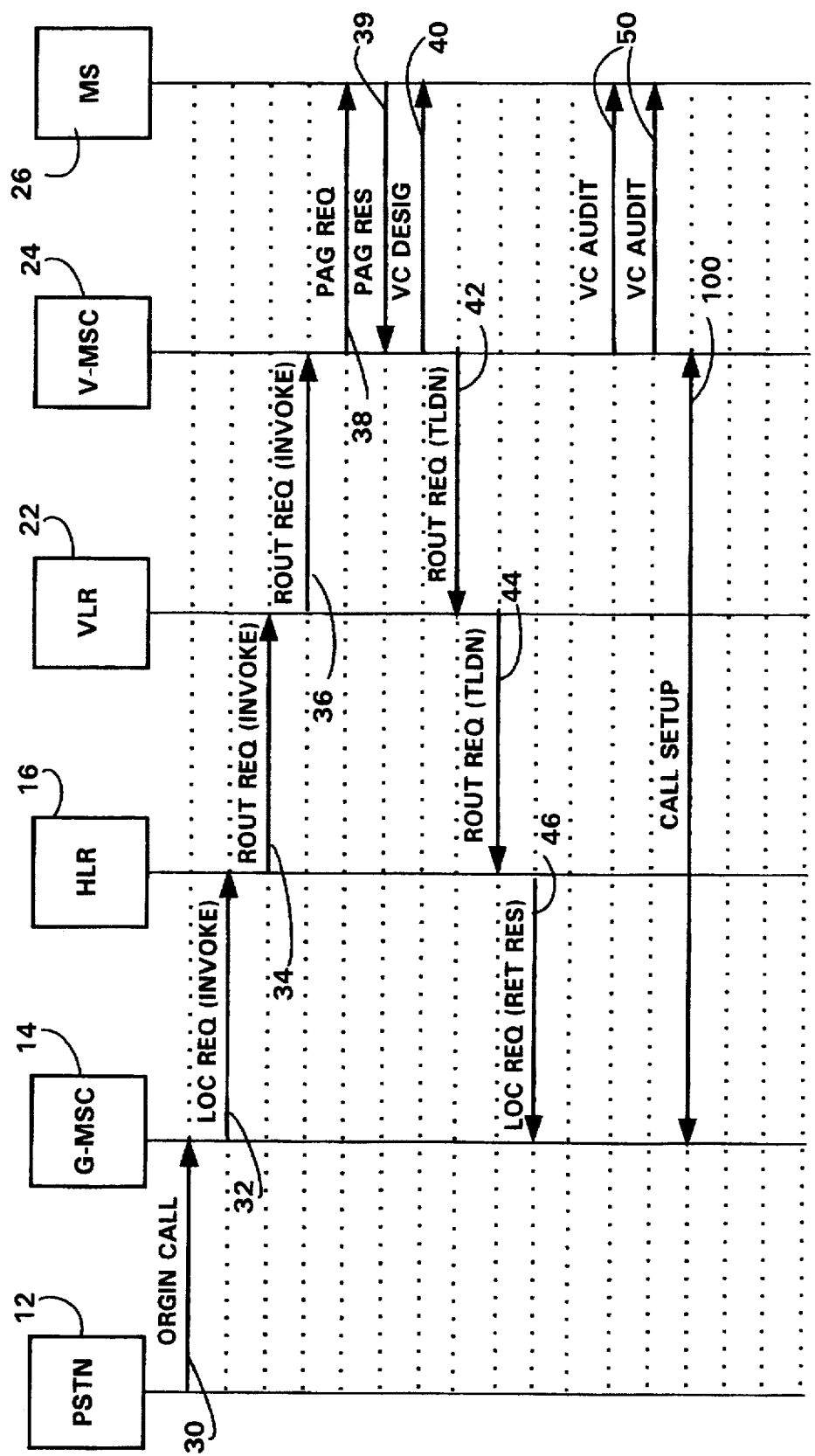
FIG. 1 (Prior Art) is a message flow diagram of an existing routing system illustrating the messages sent and received during mobile station paging and call routing in automatic roaming systems.

Referring to FIG. 1, a mobile telecommunication system utilizing page-before-call-routing procedures is shown and described wherein a called mobile station is explicitly located and connected on a voice channel to a mobile switching center while waiting for completion of call setup of an incoming call. The figures of the drawings illustrate the present invention using IS-41 intersystem specification communications protocol which is hereby incorporated by reference. However, other suitable communication protocols may be utilized without departing from the scope of the present invention.

Generally, an incoming call 30 from a public switched telephone network (PSTN) 12 to a mobile subscriber telephone number is routed to an originating system 10 having a gateway mobile switching center (G-MSC) 14 and a home location register (HLR) 16. The G-MSC 14 determines the home system of the mobile subscriber and sends a location request (LOCREQ) invoke message 32 to the HLR 16. If the subscriber is within an area served by a visiting system 20, a visiting location register (VLR) 22 receives a routing request (ROUTREQ) invoke message 34 from the HLR 16.

It will be understood and appreciated by those skilled in the art that modules G-MSC 14, and HLR 16, of originating system 10, as well as modules VLR 22, and V-MSC 24, of visiting system 20 may be logically separate from each other or may physically be within the same entity. In addition, those skilled in the art will appreciate that the actual communication along signal lines between and among the modules may vary depending upon the design of the telecommunication system and the demands placed thereon at the time of the paging process.

Before a routing number is returned to the HLR 16, the VLR 22 sends a routing request (ROUTREQ) invoke message 36 to the visiting mobile switching center (V-MSC) 24, prompting the V-MSC 24 to page and locate the roaming mobile station (MS) 26. If the MS 26 is activated in the service area of visiting system 20, the MS 26 receives page attempt 38 and returns page response 39 to the V-MSC 24. After this paging process is complete, the visiting system 20 designates a voice channel (VC DESIG) 40 between the V-MSC 24 and the MS 26.

The V-MSC 24 then returns a routing request (ROUTREQ) return result message 42, including a temporary location directory number (TLDN) for the MS 26, to the VLR 22. After the VLR 22 forwards a ROUTREQ (return result) message 44 to the HLR 16, HLR 16 returns a location request (LOCREQ) return result message 46 with the TLDN to the G-MSC 14. The G-MSC 14 then completes call setup by seizing and establishing a voice mink 100 between the G-MSC 14 and the V-MSC 24. If the routing requests and paging inquiries fail to establish a voice channel with mobile station 26, the reason for the failure is reported back to HLR 16 along signal lines (not shown) and the call is abandoned.

Routing of the IS-41 messages typically requires less than 1 second to complete. The length of time the voice channel to the MS 26 is reserved depends upon the demand on the communications system at the time the call was placed. As noted earlier, the total time from the seizure of the voice channel between the V-MSC 24 and the MS 26 to the completion of call setup may typically be several seconds and, at worst, may run a maximum period, such as 31 seconds. The majority of this time is consumed by the establishment of the voice mink 100 between the G-MSC 14 and the V-MSC 24. During the time period required to complete the call setup, a series of voice channel audit (VC AUDIT) signals 50 are periodically sent from the V-MSC 24 to the MS 26 to keep the designated voice channel open. If for any reason the call is not to be completed, the VC AUDITs 50 continue to hold the voice channel open for the maximum setup period when utilizing existing procedures.

During the time period mobile station 26 is held waiting for an incoming call on a reserved voice channel, the mobile subscriber can neither call out from the mobile station nor receive other incoming calls. In addition, other users are denied access to the resources associated with maintaining the open voice channel. The present invention enables users to better utilize system resources, discontinue the paging process, and release reserved voice channels when it is determined that the incoming call will not be completed before the expiration of the call setup period. These circumstances include, but are not limited to, situations in which the HLR contains subscriber information refusing designated call types such as long distance calls, or where the calling party drops the call at the PSTN before call setup is completed.

Figure 2:
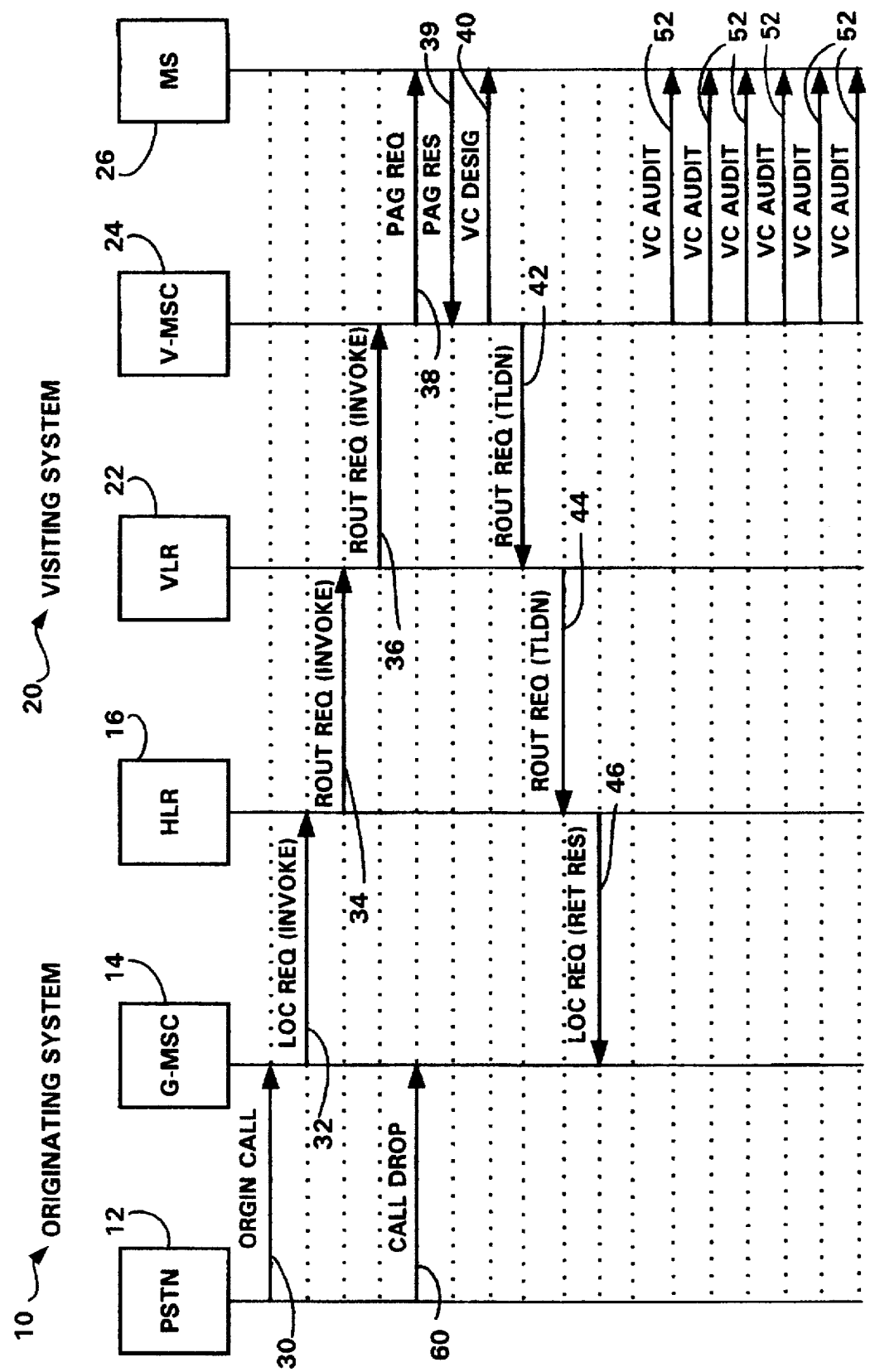
FIG. 2 (Prior Art) is a message flow diagram of the existing routing system shown in FIG. 1, further illustrating the messages sent and received when the originating call is dropped by a calling party prior to completing the call setup.

For example, referring to FIG. 2, the existing message flow during call setup is shown depicting a situation in which the original caller abandons the call by hanging-up during the setup cycle. Specifically, when incoming call 30 is dropped, a call drop signal 60 is transmitted from the PSTN 12 to the G-MSC 14. The visiting system 20, however, never learns of the call drop signal 60 and proceeds to establish the voice channel 40 between the V-MSC 24 and MS 26, and then continues to send a periodic series of VC AUDIT signals 52 until the maximum hold period has elapsed and the V-MSC 24 releases the voice channel to MS 26. This delay between the call drop signal 60 and the voice channel release 54 needlessly ties up system resources and prevents the mobile subscriber from placing outgoing calls or receiving other incoming calls. In a worst case scenario, the calling party may hang up within a second of dialing the telephone number of the mobile station 26. In existing mobile telephone systems, call setup continues as shown in FIG. 2 despite the fact that the calling party has hung up. The voice channel 40 is needlessly connected and maintained with audit messages 52 until it times out approximately 30 seconds later.

Figure 3:
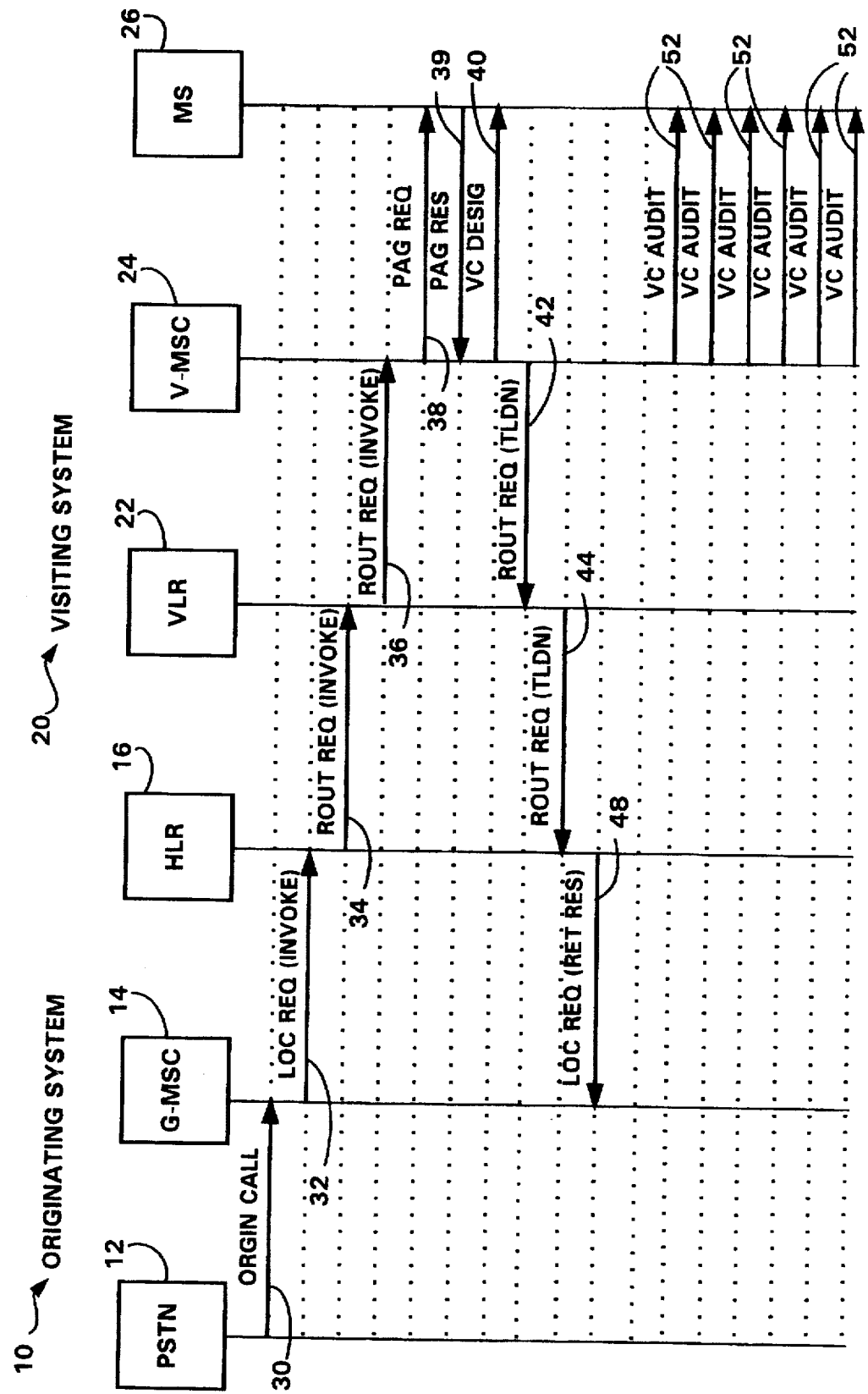
FIG. 3 (Prior Art) is a message flow diagram of the existing routing system shown in FIG. 1, further illustrating the messages sent and received when the analysis in a home location register indicates that a call is not to be connected.

Referring now to FIG. 3, the existing message flow during call setup is shown when the HLR 16 contains mobile subscriber profile information denying access for designated call types such as long distance or toll calls. In the existing system, after the VLR 22 sends the ROUTREQ (Return Result) message 44 to the HLR 16, the HLR 16 analyzes the subscriber profile for the call type to determine whether to forward the LOCREQ (Return Result) message 46 with TLDN to the G-MSC 14 as shown in FIGS. 1 and 2, or to send the LOCREQ (Return Result) message 48 without TLDN as shown in FIG. 3.

The LOCREQ 48, as shown in FIG. 3, may include a code indicating that the G-MSC 14 should be given an announcement, such as voice mail, toll call refusal, access denied, answering services or other standard options indicating that the call setup will not be completed. Regardless of the contents of the LOCREQ 48 to the G-MSC 14, the periodic transmission of VC AUDIT signals 52 will continue until expiration of the maximum audit period and release of the voice channel to MS 26 by V-MSC 24.

When incorporated within existing call routing systems such as that described above, the present invention initiates and sends an intervening resource release message which interrupts the standard call routing procedure and either stops the paging process or causes the immediate release of the voice channel. A preferred system and method of the present invention, as exemplified in FIGS. 4 and 5, is used in mobile telecommunication systems utilizing page-before-call-routing procedures having a MS 26 connected on a voice channel to a V-MSC 24 while waiting for call setup of an incoming call 30.

Figure 4:
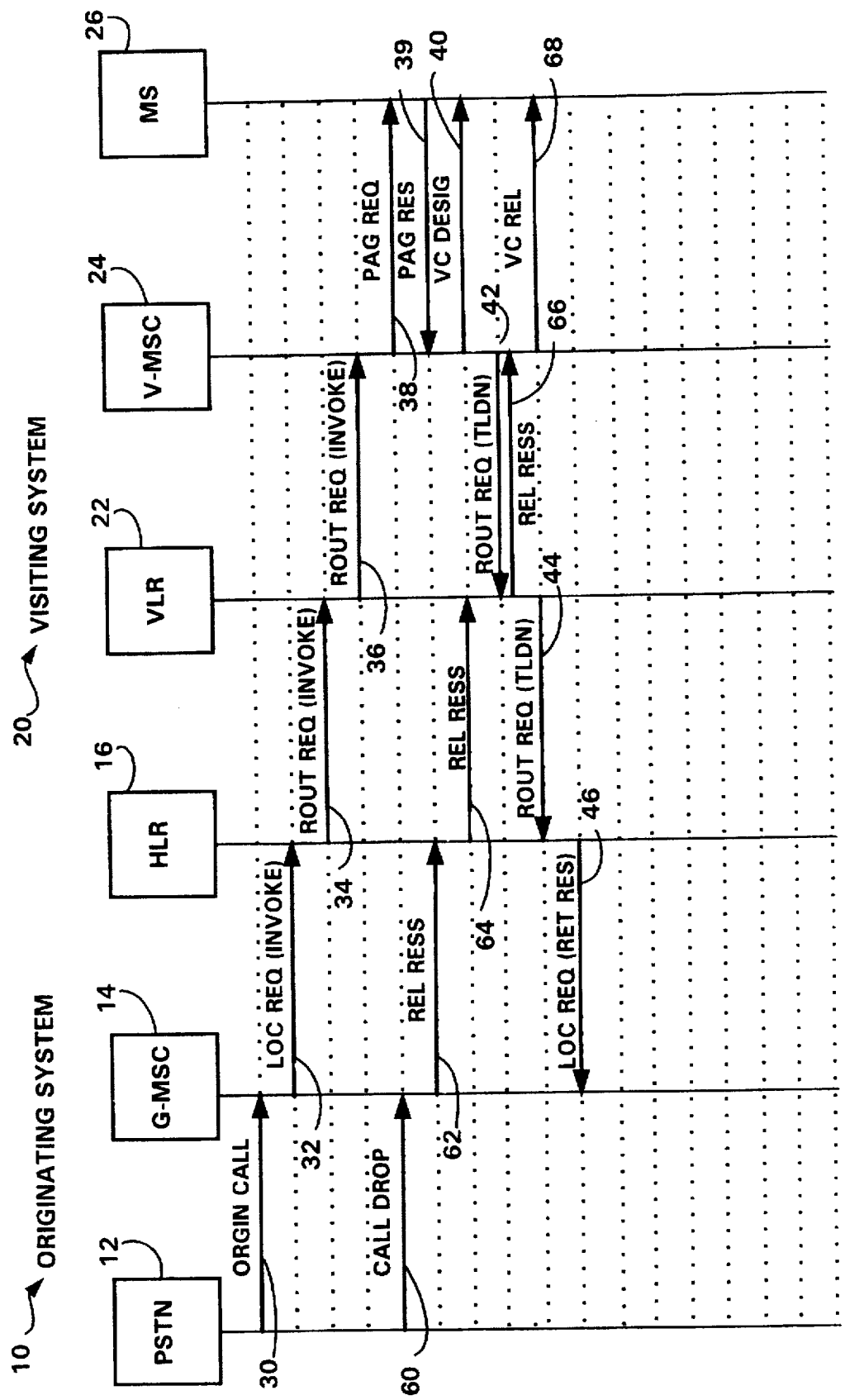
FIG. 4 is a message flow diagram illustrating the implementation of a release resources message when a call is dropped by a calling party prior to completing the call setup in a preferred embodiment of the present invention.
Figure 5:
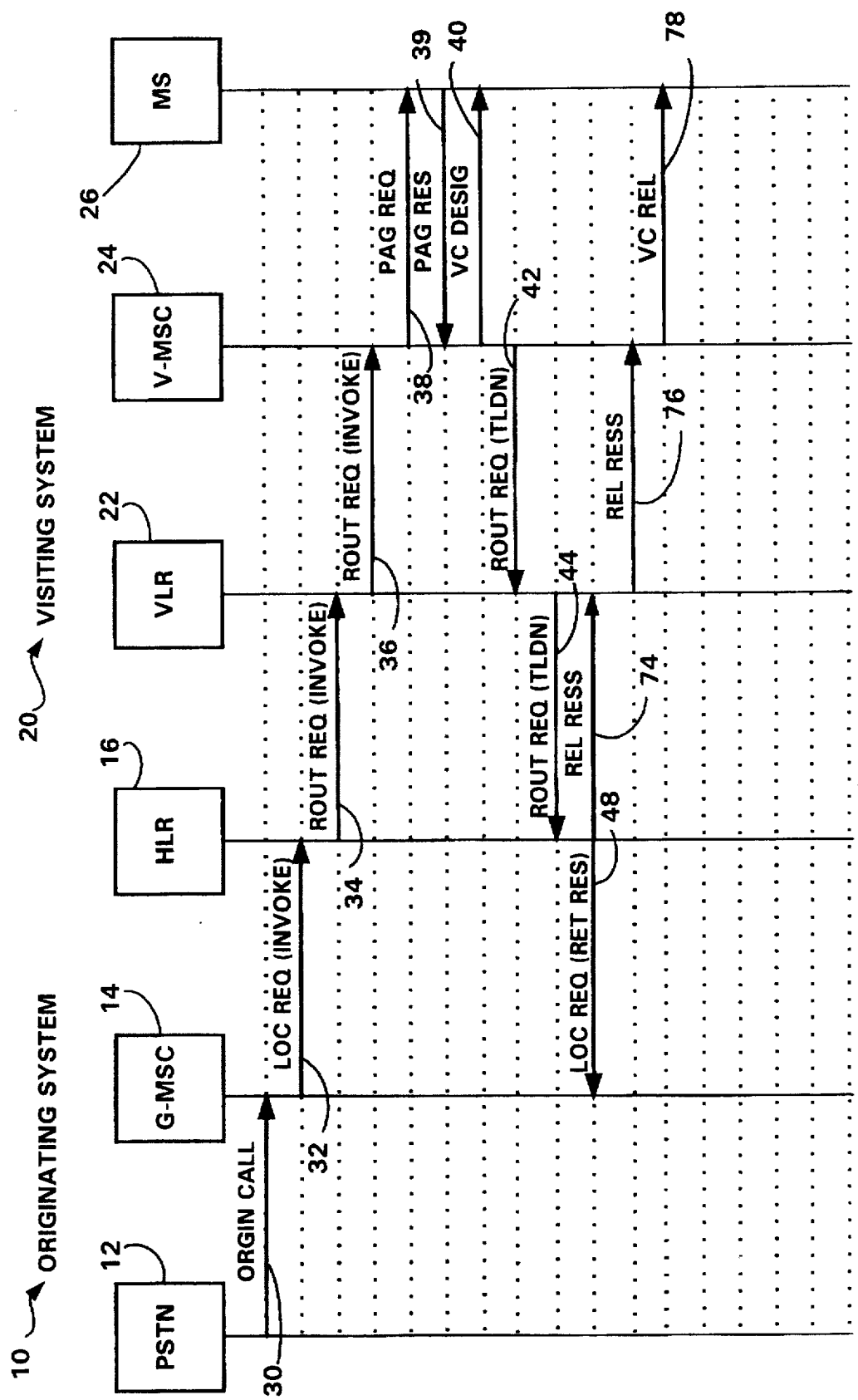
FIG. 5 is a message flow diagram illustrating the implementation of a release resources message when analysis in a home location register indicates that a call is not to be connected in a preferred embodiment of the present invention.

Referring to FIGS. 4 and 5, incoming call 30 from PSTN 12 is routed to G-MSC 14. The series of invoke messages 32, 34, 36, paging signals 38, 39, VC DESIG 40, and return result messages 42, 44, 46 occur during call setup as previously detailed in FIGS. 1 though 3. In the present invention, however, once a module of the mobile telecommunication system determines that the incoming call will not be completed, a release resources message is transmitted from the module to the V-MSC 24, prompting the V-MSC 24 to release the voice channel connected to the MS 26.

As shown in FIG. 4, after the incoming call 30 is dropped by the calling party and call drop signal 60 is transmitted from the PSTN 12 to the G-MSC 14, a series of release resources (RELRESS) messages are transmitted to the V-MSC 24. Specifically, upon receipt of the call drop 60 signal, the G-MSC transmits a release resource message 62 to the HLR 16. The HLR 16 then sends a sequential RELRESS message 64 to the VLR 22, and the VLR 22 forwards the RELRESS message 66 to the V-MSC 24. Upon receiving the RELRESS message 66, the V-MSC releases the voice channel and associated network resources at 68.

As depicted in FIG. 4, the aforementioned release of resources 68 occurs before the V-MSC 24 transmits a first voice channel audit to MS 26. It will be understood and appreciated by one skilled in the mobile telecommunication art that the call drop signal 60 of FIG. 4 may be transmitted at a point in time after the LOC REQ 46 message has been received by the G-MSC 14. In this situation, VC AUDITS, as shown in FIGS. 1 though 3 would be periodically transmitted between the V-MSC 24 and the MS 26, holding the voice channel open until the RELRESS message 66 is received by the V-MSC 24. Similarly, it will be understood and appreciated by one skilled in the art that the calling party may drop the incoming call before the V-MSC 24 to the MS 26 paging process 38, 39 is complete. In this case, the RELRESS messages 62, 64, and 66 may reach the V-MSC before a VC DESIG 40 message is sent to seize the voice channel.

Referring to FIG. 5, an alternate application of the preferred embodiment of the invention is shown. Specifically, in the page-before-call routing system depicted in FIG. 3, the preferred embodiment of the invention includes an additional series of release resource messages 74, 76 transmitted between the HLR 16, VLR 22, and V-MSC 24. In this embodiment of the invention, the HLR 16 contains a personalized subscriber profile which includes call handling information for each mobile subscriber. As shown in FIG. 5, the HLR 16 in the present invention transmits a RELRESS message 74 to the VLR 22 when it is determined that the subscriber information within the HLR 16 prohibits the incoming call type, e.g. long distance or other calls wherein the subscriber would incur additional charges associated with the call leg (or voice trunk) between the G-MSC 14 and the V-MSC 24. In this embodiment, the RELRESS message 76 would probably be received by the V-MSC 24 and the voice channel and associated network resources would be released at 78, before any voice channel audits (not shown) are sent to the MS 26.

It will be understood and appreciated by those skilled in the art that the RELRESS message may be sent at any point during the standard call setup procedure as soon as the HLR 16 determines that the call will not be completed.

The present invention provides a distinct advantage over prior art systems by reducing the amount of time that paging resources are occupied or voice channels are needlessly connected to called mobile stations. The mobile subscriber is not prevented from placing outgoing calls, and the system operator may make more efficient use of existing paging and voice channel resources to accommodate the call traffic experienced. The system operator can route a greater number of calls with a given amount of voice channel resources.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A mobile telecommunication system, comprising:
 a mobile station;
 a home location register associated with the mobile station, wherein the home location register stores a mobile subscriber profile and maintains information indicative of a mobile station's location;
 a visiting mobile switching center (V-MSC) having a service area wherein said mobile station is presently located, a paging mechanism for paging said mobile station, and a switching mechanism for establishing a voice channel between the V-MSC and the mobile station;

a gateway mobile switching center (G-MSC) for receiving and routing an incoming call to the mobile station, said G-MSC having a signaling mechanism for signaling the home location register and a switching mechanism for routing calls to the V-MSC;

a means for determining that the incoming call will not be completed; and a means for directing the telecommunication system to drop radio resources prior to call setup between the G-MSC and the V-MSC.

2. The mobile telecommunication system of claim 1, wherein the means for determining that the incoming call will not be completed includes a message signal from a public switched telephone network indicating that a calling party has hung up prior to call setup.

3. The mobile telecommunication system of claim 1, wherein the means for directing the telecommunications system to drop radio resources prior to call setup between the G-MSC and the V-MSC includes a release resources message which originates in the G-MSC and is received by the V-MSC.

4. The mobile telecommunication system of claim 3, wherein the means for directing the telecommunications system to drop radio resources prior to call setup between the G-MSC and the V-MSC includes directing the V-MSC to release a voice channel established between the V-MSC and the mobile station.

5. The mobile telecommunication system of claim 1, wherein said mobile subscriber profile in said home location register prohibits certain incoming call types, and the means for determining that the incoming call will not be completed includes means within said home location register for determining whether said mobile subscriber profile prohibits the incoming call type.

6. The mobile telecommunication system of claim 5, wherein the means for directing the telecommunication system to drop radio resources prior to call setup between the G-MSC and the V-MSC comprises a release resource message which originates in the HLR and is received by the V-MSC prior to call setup.

7. In a mobile telecommunication system, a method of releasing a voice channel and associated system resources assigned to a called mobile station, said method comprising the steps of:

receiving an incoming call for said mobile station;

paging the called mobile station;

receiving a page response from the called mobile station;

connecting a voice channel between a mobile switching center and the called mobile station;

determining, before call setup is completed, that the incoming call will not be completed;

transmitting a release resources message to said mobile switching center before call setup is completed; and immediately releasing the voice channel and associated system resources upon receipt of the release resources message in the mobile switching center.

8. The method of claim 7, wherein the step of transmitting a release resources message to said mobile switching center before call setup is completed includes transmitting a release resources message to a visiting mobile switching center.

9. The method of claim 7, wherein the step of determining that the incoming call will not be completed includes receiving a message signal from a public switched telephone network indicating that a calling party has dropped the call prior to call setup.

10. The method of claim 9, wherein the step of transmitting a release resources message to said mobile switching center before call setup is completed includes transmitting a release resources message which originates in a gateway mobile switching center to a visiting mobile switching center.

11. The method of claim 7, wherein the step of determining that the incoming call will not be completed includes determining whether a mobile subscriber profile in a home location register for said called mobile station prohibits the incoming call type.

12. The method of claim 11, wherein the step of transmitting a release resources message to said mobile switching center before call setup is completed includes transmitting a release resources message which originates in the home location register and is received by a visiting mobile switching center.

13. In a mobile telecommunication system utilizing page-before-call-routing procedures, a method of stopping a call setup process comprising the steps of:

receiving, in an originating system, an incoming call for a called mobile station;

locating and paging said called mobile station in a visiting system;

determining before call setup is completed that a call will not be routed;

transmitting a release system resources message to said visiting system before routing said call to said visiting system; and immediately releasing system resources required for call setup upon receipt of the release system resources message in the visiting system, thereby stopping the call setup process.

14. The method of claim 13 wherein said step of determining that the incoming call will not be completed includes receiving a message signal from a calling party indicating that said calling party has hung up prior to routing said call.

15. The method of claim 14 wherein the step of transmitting a release resources message includes transmitting, prior to routing said call, a release resources message which originates in a gateway mobile switching center (G-MSC) and is received by a visiting mobile switching center (V-MSC) having a mobile station connected on a voice channel.

16. The method of claim 13 wherein said step of determining that the incoming call will not be completed includes determining whether a mobile subscriber profile in a home location register (HLR) associated with a called mobile station prohibits the incoming call type.

17. The method of claim 16 wherein said step of determining whether a mobile subscriber profile prohibits the incoming call type includes analyzing said mobile subscriber profile after receipt of a routing request (return result) message at said HLR.

18. The method of claim 17 wherein said step of transmitting a release resources message includes transmitting a release resources message which originates in said HLR and is received by a V-MSC prior to routing said call.

19. In a mobile telecommunication system having a mobile station and system resources for call setup, a method of releasing said system resources comprising the steps of:

receiving an incoming call for said mobile station;

paging the called mobile station through a mobile switching center;

determining, before call setup is completed, that the incoming call will not be completed;

transmitting a release resources message to said mobile switching center before call setup is completed; and immediately releasing the system resources for call setup upon receiving said release resources message in the mobile switching center.

20. The method of claim 19, wherein the step of determining that the incoming call will not be completed includes receiving a message signal from a public switched telephone network indicating that a calling party has dropped the call prior to call setup.

21. The method of claim 19, wherein the step of transmitting a release resources message to said mobile switching center includes transmitting a release resources message which originates in a gateway mobile switching center to a visiting mobile switching center before call setup is completed.

22. The method of claim 19, wherein the step of determining that the incoming call will not be completed includes determining whether a mobile subscriber profile in a home location register for said called mobile station prohibits the incoming call type.

23. The method of claim 22, wherein the step of transmitting a release resources message to said mobile switching center includes transmitting a release resources message which originates in the home location register and is received by a visiting mobile switching center before call setup is completed.

\* \* \* \* \*

UNITED STATES PATENT AND TRADEMARK OFFICE
CERTIFICATE OF CORRECTION

PATENT NO. : 5,711,006

DATED : January 20, 1998

INVENTOR(S) : Jean-Pierre Brochu and Francois Sawyer

It is certified that error appears in the above-identified patent and that said Letters Patent is hereby corrected as shown below:

Column 4, line 23, change "mink" to --trunk--; and
Column 4, line 37, change "mink" to --trunk--.

Signed and Sealed this

Twenty-first Day of April, 1998

*Attest:*

BRUCE LEHMAN

*Attesting Officer*    *Commissioner of Patents and Trademarks*